Feb. 23, 1960

B. H. PINCKAERS 2,926,296

TRANSISTOR INVERTER

Filed Oct. 27, 1954

INVENTOR
B. H. PINCKAERS

BY George H Fisher

ATTORNEY

2,926,296

TRANSISTOR INVERTER

Balthasar Hubert Pinckaers, Hopkins, Minn., assignor to Minneapolis-Honeywell Regulator Company, Minneapolis, Minn., a corporation of Delaware Application October 27, 1954, Serial No. 465,008

7 Claims. (Cl. 321—45)

This invention relates to a new and improved transistor circuit for converting a variable magnitude reversible polarity direct current signal to an alternating signal of variable magnitude and reversible phase.

An object of the invention is to provide an electronic modulator comprising a transistor circuit for converting a reversible polarity D.C. signal to a reversible phase A.C. signal which is proportional in magnitude to the magnitude of the D.C. signal.

Another object of this invention is to provide a D.C. to A.C. signal converter which is very compact and which has no moving parts.

A further object of the invention is to provide an extremely sensitive D.C. to A.C. chopper to detect and convert minute D.C. potentials into reversible phase A.C. signals.

Figure 1:
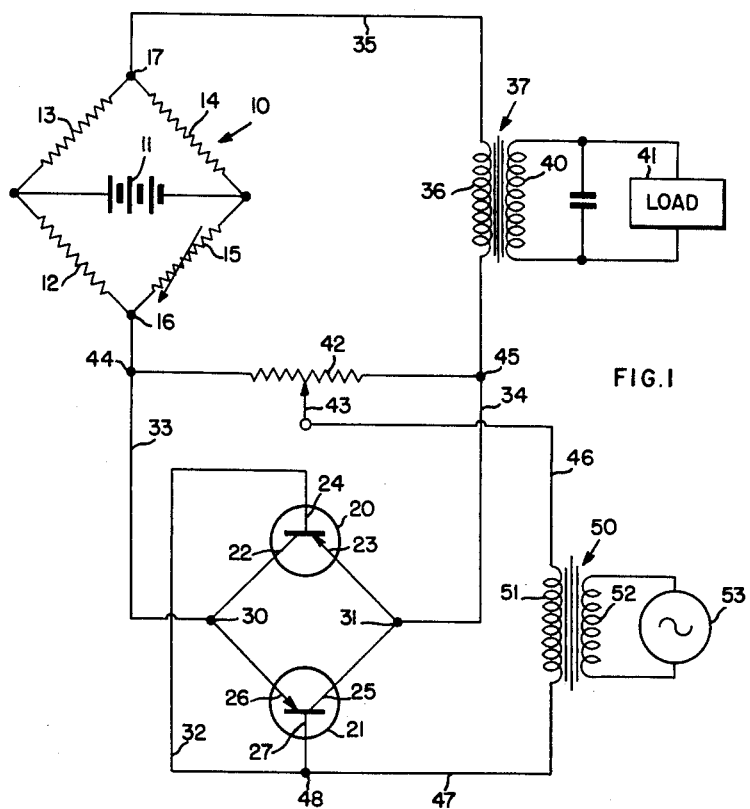
Figure 2:
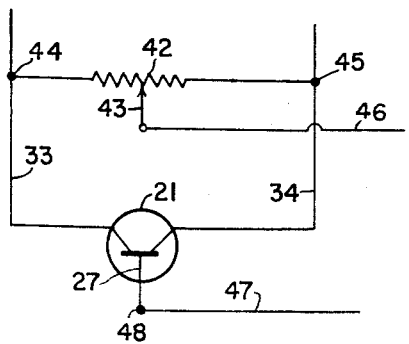

These and other objects of the present invention will be understood upon consideration of the accompanying specification, claims and drawing of which:

Figure 1 of the drawing is a schematic showing of a preferred embodiment of the invention; and Figure 2 is a modification of a portion of the circuit of Figure 1 in which a single transistor is used.

Referring now to Figure 1 of the drawing there is shown a D.C. impedance bridge circuit 10, such as is well known in the art, which comprises a source of D.C. potential 11, three fixed impedances 12, 13 and 14, and a condition responsive impedance 15 which is variable in resistivity with changes in the condition. The bridge has a pair of output terminals 16 and 17. A pair of transistors 20 and 21 are included in the circuit and may be junction PNP transistors, or other suitable type. Transistor 20 includes a collector electrode 22, an emitter electrode 23, and a base electrode 24, and transistor 21 has a collector electrode 25, an emitter electrode 26 and a base electrode 27. Collector 22 and emitter 26 are connected together at a junction 30 and collector 25 and emitter 23 are connected together at a junction 31. The base electrodes 24 and 27 are connected together by a conductor 32. Collector 22 and emitter 26 are connected to output terminal 16 of the bridge 10 by a conductor 33. Collector 25 and emitter 23 are connected to output terminal 17 of the bridge by a conductor 34, primary winding 36 of a transformer 37, and a conductor 35. Transformer 37 also includes a secondary winding 40 which is connected to a phase sensitive load device 41. A potentiometer 42 having a wiper 43 is connected across conductors 33 and 34 at junctions 44 and 45 respectively. Wiper 43 is connected to base electrodes 24 and 27 through a series circuit which consists of a conductor 46 the secondary winding 51 of a transformer 50, and conductor 47 to a junction 48 with conductor 32 which connects the base electrodes together. Transformer 50 also includes a primary winding 52 which is connected to and energized from an A.C. reference source 53 which may be, for example, a transistor oscillator.

The operation of the circuit may be described as follows. D.C. bridge 10 is a conventional type which produces at output terminals 16 and 17 a D.C. potential whose polarity and magnitude is determined by the direction and magnitude of the bridge unbalance. The bridge unbalance is caused by a change of the value of condition responsive impedance element 15 which may be, for example, a temperature responsive element. Let us assume a condition of bridge unbalance whereby the value of impedance 15 has increased so that terminal 16 becomes positive with respect to terminal 17. A current path may then be traced from terminal 16, through conductor 33, emitter 26 of transistor 21 to collector 25, conductor 34, through transformer winding 36 and conductor 35 to bridge terminal 17. The magnitude of current flow, assuming transistor 21 is biased in a conducting condition, is proportional to the amount of bridge unbalance. The source of A.C. reference voltage 53 is of constant magnitude and the A.C. potential induced into secondary winding 51 from the source is applied as a bias potential to the transistors. The lower terminal of winding 51 is connected to the two base electrodes 24 and 27 and the upper terminal is connected by means of potentiometer 42 and conductors 33 and 34 to the emitters and collectors of the transistors to apply an alternating bias to the transistors, thus alternately gating the transistors to a conducting and then nonconducting state. The magnitude of alternating potential applied from the reference source will of course determine the control exercised on the transistors.

It will now be clearly understood that the direct current flowing through transistor 21 due to bridge unbalance, as previously explained, will be allowed to flow freely during the portion of the reference cycle in which the base 27 is driven negative with respect to emitter 26 and the direct current will be reduced or cut off during the portions of the reference potential cycle in which the base is driven in a positive direction with respect to the emitter 26. The resultant pulsating direct current flowing in output transformer winding 36 produces a changing flux in the transformer resulting in an A.C. output to phase sensitive load device 41. Load device 41 may be, for example, a phase sensitive electronic motor control system.

If the bridge 10 is unbalanced in the opposite direction so that terminal 17 becomes positive with respect to terminal 16 a pulsating direct current will flow in the opposite direction through conductor 35, winding 36, conductor 34, emitter 23 of transistor 20 to collector 22, and through conductor 33 to terminal 16. This will provide an alternating output to the phase sensitive load device of opposite phase from that previously described.

If a transistor having symmetrical properties is used in this modulator circuit it is possible to substitute this transistor, as is shown in Figure 2, for the two transistors shown in the embodiment of Figure 1 of the drawing. Under conditions of operation to compensate for circuit unbalance wiper 43 is adjusted for zero A.C. output to the load when the bridge is balanced. This modulator circuit is extremely sensitive and has produced a usable output signal with a 10 microvolt unbalance signal from bridge 10.

Many changes and modifications of this invention will undoubtedly occur to those who are skilled in the art and I therefore wish it to be understood that I intend to be limited by the scope of the appended claims and not by the specific embodiment of my invention which is described herein for the purpose of illustration only.

I claim as my invention:

1. Transistor modulator means comprising: first and second transistors each of said transistors having a collector electrode, an emitter electrode, and a base electrode; means connecting the emitter and collector of said first transistor to the collector and emitter respectively of said second transistor; means for producing a direct current potential of reversible polarity and variable magnitude; output means; circuit means connecting said transistors in a series loop with said potential producing means and said output means so that the current from said potential producing means flows through said transistors and said output means; and means for connecting a source of alternating reference potential from said base electrodes to other of said electrodes to gate said transistors from a conducting to a nonconducting state to control the current flow through said output means due to said first mentioned potential producing means.

2. Electrical signal converter apparatus comprising: condition responsive means for producing a direct current potential which is variable in magnitude and reversible in polarity in response to a condition; output transformer means adapted to be connected to a load device; a pair of transistors each comprising an emitter electrode, a collector electrode and a base electrode; means connecting the emitter and collector of the first transistor to the collector and emitter respectively of the second transistor; circuit means connecting said transistors in a series loop with said potential producing means and said output transformer means so that the current flowing from said potential producing means flows through said transistors and said output means; and means for connecting a source of alternating potential from said base electrodes to the other of said electrodes to continuously vary the bias on said transistors from a conducting to a relatively nonconducting state and thereby cause a pulsating direct current to flow through said output transformer means.

3. Electrical signal converter apparatus comprising: transistor amplifier means having a plurality of electrodes including collector, emitter, and base electrodes; means producing a direct current potential of reversible polarity and variable magnitude in response to a condition; output circuit means; means connecting a continuous source of alternating current reference potential from said base to said other named electrodes to continuously vary the bias applied to said transistor means to vary said transistor means alternately from a conductive to a non-conductive state at a frequency determined by said alternating potential frequency; and circuit means connecting said direct current potential producing means, said output means and said transistor means in a series type circuit, whereby a current is caused to flow through said transistor means and said output means of said series type circuit from said potential producing means, said current being periodically interrupted by said varying state of conductivity of said transistor means to produce at said output means an alternating type current of variable magnitude and reversible phase dependent upon the magnitude and polarity of said potential producing means.

4. Electrical signal converter apparatus comprising: a transistor amplifying device having a plurality of electrodes including output electrodes and a control electrode; input terminals connected to said control electrode and at least one of said output electrodes; means producing a direct current potential of variable magnitude and reversible polarity; output means; means connecting a continuous source of alternating current to said input terminals as a bias source thereby alternately varying said transistor from a conductive to a non-conductive state; and circuit means connecting said direct current potential producing means, said output means, and said transistor output electrodes in a series circuit, whereby an alternating type current is caused to flow through said transistor and said output means from said potential producing means to produce at said output means an alternating type current of variable magnitude and reversible phase dependent upon the magnitude and polarity respectively of the output of said potential producing means.

5. Electrical signal converter apparatus comprising: a transistor having a plurality of electrodes including an emitter, a base, and a collector, said emitter and collector comprising output electrodes; means producing a direct current potential of variable magnitude and reversible polarity; output means; means connecting a source of alternating current reference potential from said base electrode to said other named electrodes; and circuit means connecting said direct current potential producing means, said output means, and said output electrodes of said transistor in a series circuit, whereby said alternating potential varies the conductivity of said transistor at a rate determined by the alternating frequency to cause an alternating type current to flow in said output means of a magnitude and phase determined by the magnitude and polarity of said direct current potential.

6. Electrical signal converter apparatus comprising: voltage producing means for producing a direct current voltage in response to being subjected to a condition; output transformer means having a primary and a secondary winding; transistor amplifier means comprising a plurality of electrodes including an emitter electrode, a collector electrode, and a base electrode; a resistive network having end terminals and an intermediate tap; circuit means connecting said collector and emitter electrodes to the end terminals of said resistive network; circuit means connecting said voltage producing means, said transformer primary winding, and said transistor means in a series type circuit; a source of alternating reference voltage; and means connecting said source of alternating reference voltage to said transistor means base electrode and to the tap of said resistive network for cyclically gating said transistor means from a conducting to a non-conducting state to thereby cause a cyclic fluctuation in the impedance of said series circuit connecting said voltage producing means to said transformer primary winding to periodically interrupt the direct current voltage introduced by said voltage producing means to thereby produce an alternating voltage in the secondary winding of said transformer means indicative of said voltage producing means being subjected to said condition.

7. In combination, voltage producing means capable of producing a direct current voltage upon being subjected to a condition, a transformer having a primary and a secondary winding, a potentiometer having a resistance element and a movable tap, circuit means connecting said voltage producing means, said transformer primary winding and said potentiometer resistance element in a series circuit, a transistor having a base, an emitter and a collector electrode, circuit means connecting said transistor collector and emitter electrodes to the end terminals of said potentiometer resistance element, a source of alternating voltage, and circuit means connecting said source of alternating voltage to said potentiometer tap and said transistor base electrode to thereby cause a cyclic fluctuation in the impedance of said series circuit connecting said voltage producing means to said transformer primary winding and thereby effectively chop the direct current voltage produced by said voltage producing means and produce an alternating voltage in the secondary winding of said transformer indicative of said voltage producing means being subjected to said condition.

References Cited in the file of this patent

UNITED STATES PATENTS

| | | |
|---|---|---|
| 1,949,383 | Weber | Feb. 27, 1934 |
| 2,148,718 | Agins | Feb. 28, 1939 |
| 2,502,479 | Pearson et al. | Apr. 4, 1950 |
| 2,620,466 | Hagen | Dec. 2, 1952 |